(12) United States Patent
Fleming et al.

(10) Patent No.: US 12,131,291 B2
(45) Date of Patent: Oct. 29, 2024

(54) METHOD, COMPUTER DEVICE, AND NON-TRANSITORY COMPUTER-READABLE DEVICE FOR INTERACTIVE PARTS DRAWINGS WITH A REAL-TIME BILL OF MATERIALS

(71) Applicant: Cornell Pump Company, Clackamas, OR (US)

(72) Inventors: Grayson Fleming, Clackamas, OR (US); Erick Johnson, Gresham, OR (US); Andrew Enterline, Troutdale, OR (US); Adam Lindeman, Portland, OR (US)

(73) Assignee: Cornell Pump Company, LLC, Wilmington, DE (US)

( * ) Notice: Subject to any disclaimer, the term of this patent is extended or adjusted under 35 U.S.C. 154(b) by 0 days.

(21) Appl. No.: 17/464,487

(22) Filed: Sep. 1, 2021

(65) Prior Publication Data

US 2022/0083974 A1    Mar. 17, 2022

Related U.S. Application Data

(60) Provisional application No. 63/077,961, filed on Sep. 14, 2020.

(51) Int. Cl.
*G06Q 10/0875* (2023.01)
*G06Q 30/0601* (2023.01)

(52) U.S. Cl.
CPC ..... *G06Q 10/0875* (2013.01); *G06Q 30/0603* (2013.01); *G06Q 30/0643* (2013.01)

(58) Field of Classification Search
CPC .............. G06Q 30/06–08; G06Q 10/0875
See application file for complete search history.

(56) References Cited

U.S. PATENT DOCUMENTS 6,611,725 B1    8/2003    Harrison et al.
7,392,480 B2    6/2008    Harrison
(Continued)

FOREIGN PATENT DOCUMENTS

CN    102120903 A    7/2011
CN    107563838 A    1/2018
(Continued)

OTHER PUBLICATIONS

Babbitt, C.W., et al. "Disassembly-based bill of materials data for consumer electronic products." Scientific Data 7, 251. https://doi.org/10.1038/s41597-020-0573-9 (Year: 2020).*

(Continued)

*Primary Examiner* — Allison G Wood
*Assistant Examiner* — Katherine A Barlow
(74) *Attorney, Agent, or Firm* — Snyder, Clark, Lesch & Chung, LLP

(57) ABSTRACT

A computer device may include a memory storing instructions and a processor configured to execute the instructions to detect a selection of an item in a content catalog and display a drawing of a device corresponding to the selected item, wherein the device includes a set of components. The processor may be further configured to request a real-time bill of materials (BOM) corresponding to the device from an Enterprise Resource Planning (ERP) system, in response to detecting the selection of the item; receive the requested real-time BOM from the ERP system device; generate a BOM table based on the received real-time BOM; and match particular entries in the generated BOM table with particular ones of the plurality of components.

19 Claims, 11 Drawing Sheets

(56) References Cited

U.S. PATENT DOCUMENTS

| | | | |
|---|---|---|---|
| 8,291,309 B2 | 10/2012 | Callaghan et al. | |
| 9,646,268 B1* | 5/2017 | Workman | G06F 30/00 |
| 9,799,066 B2* | 10/2017 | Nizam | G06Q 30/0633 |
| 10,033,719 B1* | 7/2018 | Baranowski | H04L 63/123 |
| 11,599,925 B1* | 3/2023 | Ashby | G06Q 30/0621 |
| 2002/0026385 A1* | 2/2002 | McCloskey | G06Q 30/0641 |
| | | | 705/26.8 |
| 2003/0098862 A1 | 5/2003 | Hunt et al. | |
| 2003/0122875 A1 | 7/2003 | Linder | |
| 2003/0172366 A1 | 9/2003 | Rhee et al. | |
| 2004/0249727 A1* | 12/2004 | Cook Jr. | G06Q 30/0641 |
| | | | 705/26.81 |
| 2004/0254864 A1* | 12/2004 | Mitsuoka | G06Q 10/0875 |
| | | | 705/29 |
| 2007/0162171 A1* | 7/2007 | McDonald | G06Q 10/0875 |
| | | | 700/106 |
| 2009/0043759 A1* | 2/2009 | Danish | G06Q 30/0225 |
| | | | 707/999.005 |
| 2009/0195553 A1 | 8/2009 | Mathew et al. | |
| 2010/0010918 A1* | 1/2010 | Hunt | G06Q 20/102 |
| | | | 705/40 |
| 2010/0192058 A1* | 7/2010 | Rountree | G06Q 30/02 |
| | | | 715/246 |
| 2012/0191733 A1 | 7/2012 | Xiao et al. | |
| 2014/0025529 A1* | 1/2014 | Honeycutt | G06Q 30/0621 |
| | | | 705/26.5 |
| 2014/0173526 A1 | 6/2014 | Pisaris-Henderson | |
| 2015/0339744 A1* | 11/2015 | Jaffarian | G06Q 10/20 |
| | | | 705/26.4 |
| 2020/0134560 A1 | 4/2020 | McLinden et al. | |

FOREIGN PATENT DOCUMENTS

| | | |
|---|---|---|
| EP | 1 214 647 B1 | 2/2004 |
| EP | 1 742 181 B1 | 6/2011 |
| KR | 10-2010-0043386 A | 4/2010 |

OTHER PUBLICATIONS

Shih, W.C., et al. "The Biggest Challenges of Data-Driven Manufacturing" Harvard Business Review. HBR.org (Year: 2016).*

"Highlight." Merriam-Webster.com Dictionary, Merriam-Webster, https://www.merriam-webster.com/dictionary/highlight. Accessed Mar. 29, 2023. (Year: 2023).*

He, L., et al. "Integration of bill of materials with unified bill of materials model for commercial aircraft design to manufacturing" Concurrent Engineering vol. 22, Issue 3, pp. 206-217. (Year: 2014).*

International Search Report and Written Opinion issued for the corresponding international application No. PCT/US2021/048729, mailed Dec. 14, 2021, 11 pages.

* cited by examiner

| PART NUMBER 410 | DESCRIPTION 420 | QUANTITY 430 | AVAILABILITY 440 | LEAD TIME 450 | MATCHING LABEL 460 | EVENT LISTENER 470 |
|---|---|---|---|---|---|---|ил
| | | | | | | |

(12) United States Patent

METHOD, COMPUTER DEVICE, AND NON-TRANSITORY COMPUTER-READABLE DEVICE FOR INTERACTIVE PARTS DRAWINGS WITH A REAL-TIME BILL OF MATERIALS

CROSS REFERENCE TO RELATED APPLICATION

This application claims priority under 35 U.S.C. § 119, based on U.S. Provisional Patent Application No. 63/077, 961 filed Sep. 14, 2020, titled "INTERACTIVE PARTS DRAWINGS WITH A REAL-TIME BILL OF MATERIALS," the disclosure of which is hereby incorporated by reference.

BACKGROUND INFORMATION

A manufacturer of industrial equipment may sell a large number of different devices and each device may include multiple parts. The manufacturer may maintain an online catalog of devices available for sale that may be accessible via a web site. Maintaining an online catalog of a large number of different devices may pose various challenges.

BRIEF DESCRIPTION OF THE DRAWINGS

FIG. 4 illustrates exemplary components of the bill of materials (BOM) table of FIG. 3 according to an implementation described herein;

DETAILED DESCRIPTION OF PREFERRED EMBODIMENTS

Figure 1:
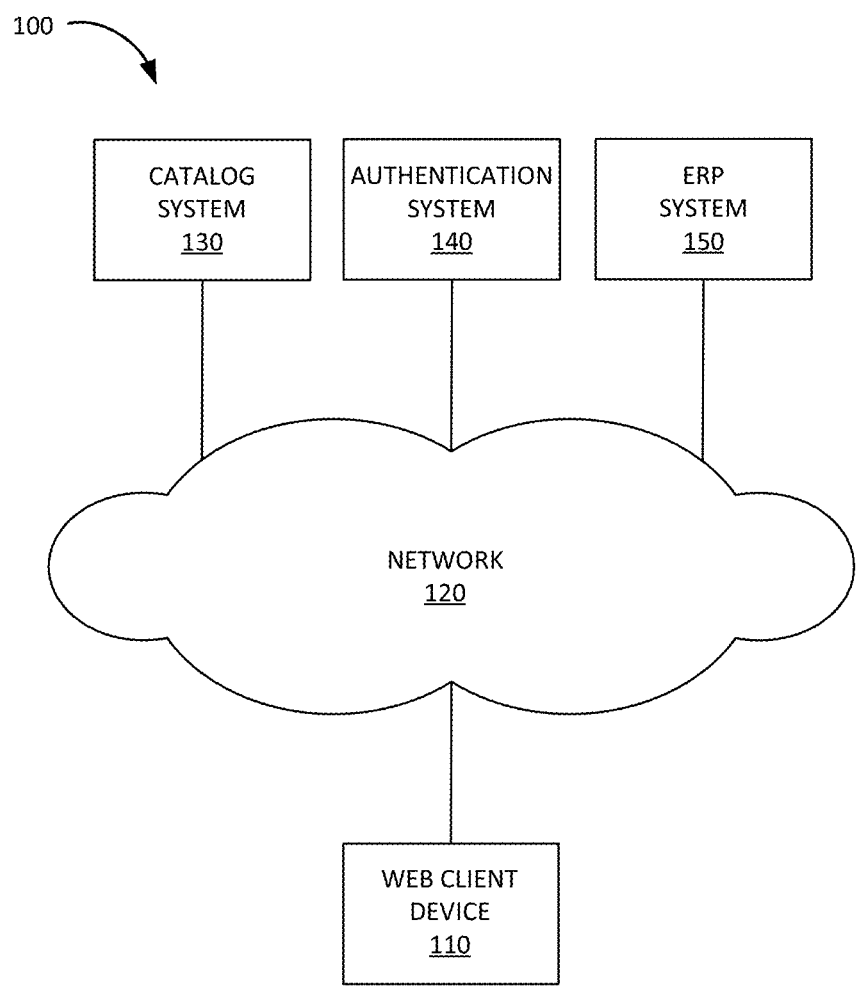
FIG. 1 illustrates an environment according to an implementation described herein.

The following detailed description refers to the accompanying drawings. The same reference numbers in different drawings identify the same or similar elements.

A manufacturer of equipment may maintain an online catalog of equipment for sale. A customer may access a web site that enables the customer to browse the online catalog of equipment. Each piece of equipment or device may be illustrated using a drawing. The device may include multiple components or parts that may be individually available for purchase and may be listed in a bill of materials (BOM). A BOM may list the components and/or subassemblies of the device as well as the quantities of each component and/or sub-assembly needed to manufacture or assemble the device. The BOM may be built into the drawing of the device. However, the BOM or the drawings may be frequently updated. For example, if the BOM is incorporated into the drawing of the device, updating the BOM would require updating the drawing each time. Keeping track of BOMs and drawings in a large catalog to ensure accuracy may be very difficult and time consuming.

Implementations described herein relate to interactive parts drawings with a real-time BOM. When a user accesses a web page of an online catalog that includes a drawing of a device with multiple components using a computer device running a browser application, the browser application may receive a Scalable Vector Graphic (SVG) file, and/or another type of graphics file, and generate and display a drawing of the device using the SVG file. The web page may include instructions, such as client-side JavaScript instructions, to request a real-time BOM from an enterprise resource planning (ERP) system. The computer device may execute the instructions and send a Hypertext Transfer Protocol (HTTP) GET request to a web server to request the real-time BOM associated with the device. In some implementations, the HTTP GET request may include authentication credentials associated with the user and the user may need to be authenticated by the web server before the BOM is provided.

The computer device may receive the real-time BOM from the ERP system via the web server and may generate a BOM table based on the received real-time BOM. The BOM may include, for each entry in the BOM, a part number for a component of the device in the drawing, a part description for the part number, an available quantity for the part number, a stock availability for the part number, a lead time for the part number, and/or other types of information associated with the part number.

The computer device may them match each entry in the generate BOM table with a component of the device in the generated drawing. For example, the computer device may select an entry in the generated BOM table, identify a label in the drawing that matches a part name in the selected entry, and associate the selected entry with the identified label. The computer device may then add an event listener to the matched entry and configure the event listener to highlight the selected entry and the identified label in response to a hover or mouse-over event. Thus, when the browser application detects selection of an entry in the generated BOM table as a result of a hover or mouse-over event over the entry, the browser application may highlight the selected entry and the matching label in the drawing.

If no match for an entry in the BOM table is identified in the drawing, the entry may be highlighted to indicate that the entry is not available in the drawing, such as, for example, by graying out the entry, tinting the entry off-color, changing the font of the entry to a strikethrough font, and/or otherwise highlight the entry to indicate unavailability.

The drawings may be hierarchically structured so that a component in a drawing of the device may correspond to a subassembly with its own set of components and its own BOM. Thus, when the user selects a component that corresponds to a subassembly by clicking on the component in the drawing or by clicking on an entry in the generated BOM table that corresponds to the component, the browser application may determine that the selected component corresponds to another device with a set of components and display another drawing corresponding to the subassembly device. The browser application may then request the real-time BOM corresponding to the subassembly, generate a new BOM table and match entries in the new BOM table with labels of components in the subassembly, and add an event listener to each matched entry.

Providing a real-time BOM in connection with a drawing eliminates the need for a time-consuming and difficult task of tracking and implementing changes in drawings, or updating multiple storage locations, when a change is made in a BOM associated with a drawing. Thus, the BOMs may be maintained in a central database and a BOM may be requested from the central database when a drawing is accessed. Furthermore, the hierarchical and scalable nature of the SVG drawings may enable a drafter to create or update a drawing one time and the changes to the drawing may be reflected in a large number of BOMs that include a part number that references a part number included in the drawing. Furthermore, maintaining an up-to-date availability and quantity for each part in a BOM may provide real-time information to a customer as to whether a particular component or part is available for purchase.

FIG. 1 is a diagram of an exemplary environment 100 in which the systems and/or methods, described herein, may be implemented. As shown in FIG. 1, environment 100 may include a web client device 110, a network 120, a catalog system 130, an authentication system 140, and an ERP system 150.

Web client device 110 may include a computer device that includes a browser application, or another type of application configured to communicate with catalog system 130, and that includes the capability to connect to a network using a wired and/or wireless connection. For example, web client device 110 may include a desktop computer device; a laptop computer, a tablet computer, or another type of portable computer; a handheld wireless communication device (e.g., a mobile phone, a smart phone, a tablet device, etc.); a wearable computer device (e.g., a head-mounted display computer device, a wristwatch computer device, etc.); and/or any other type of computer device with communication capabilities and a user interface. Web client device 110 may include a browser application and/or another type of application configured to communicate with catalog system 130. Web client device 110 may connect to network 120 using a wired connection and/or a wireless connection, such as a WiFi and/or cellular connection.

Network 120 may include a network that enables Internet Protocol (IP) based communication. For example, network 120 may include a local area network (LAN), a wide area network (WAN), a metropolitan area network (MAN), an autonomous system (AS) on the Internet, an intranet, an optical network, a cable television network, a satellite network, a wireless cellular network, an ad hoc network, or a combination of any of such networks.

Catalog system 130 may include one or more computer devices, such as server devices, that include a web server that hosts an online content catalog of equipment devices available for purchase. Each item in the content catalog may be associated with a web page that includes one or more graphics files for generating a drawing of a device and client-side code to be downloaded and executed via a browser application. The code may instruct the browser application to request a real-time BOM for the drawing.

Authentication system 140 may include one or more computer devices, such as server devices, the perform authentication services for catalog system 130 and/or ERP system 150. For example, authentication system 140 may store authentication credentials of users for accessing the online catalog hosted by catalog system 130 via web client device 110. Moreover, authentication system 140 may store authentication credentials to authenticate a web server associated with catalog system 130 with ERP system 150.

ERP system 150 may include one or more computer devices, such as server devices, that maintain an ERP database for the items in content catalog. Each item in the content catalog may be associated with an up-to-date BOM in the ERP database. The BOM may store a list of components for the item as well as the available quantity for each component. ERP system 150 may provide a real-time BOM to web client device 110 via catalog system 110 for an item in the content catalog when a user accesses a drawing for the item.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100. For example, while catalog system 130, authentication system 140, and ERP system 150 are illustrated as separate systems in FIG. 1, in some implementations, catalog system 130, authentication system 140, and/or ERP system 150 may be implemented on a same device or set of devices. For example, one or more of catalog system 130, authentication system 140, and/or ERP system 150 may be implemented in a cloud computing data center on a commonly shared physical infrastructure. As another example, in some implementations, web client device 110 may interact directly with ERP system 150 to obtain a real-time BOM.

Figure 2:
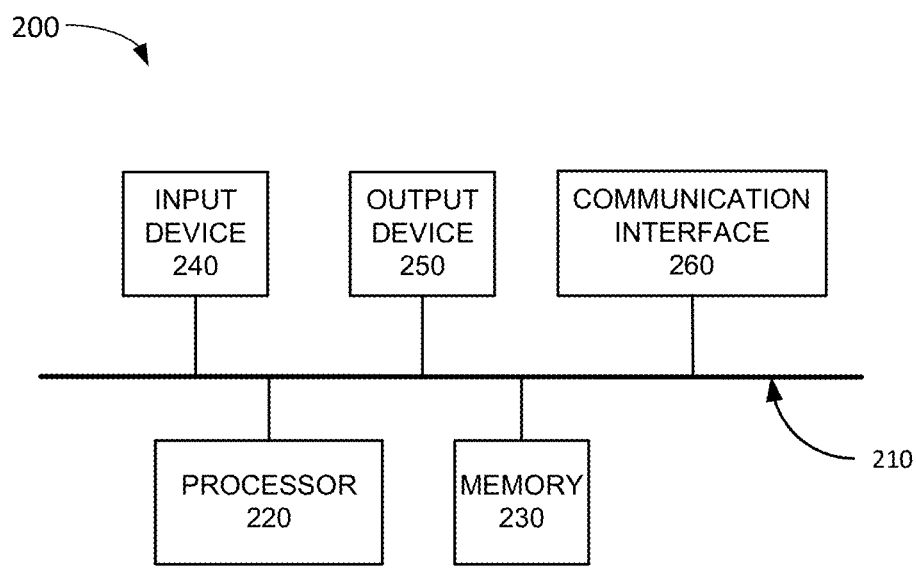
FIG. 2 illustrates exemplary components of a device that may be included in one or more of the components of FIG. 1 according to an implementation described herein.

FIG. 2 is a diagram illustrating example components of a device 200 according to an implementation described herein. Web client device 110, catalog system 130, authentication system 140, and/or ERP system 150 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD), light emitting diode (LED) display, etc., for displaying content to the operator. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to interactive drawings of devices with a real-time BOM. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally, or alternatively, one or more components of device 200 may perform one or more tasks described as being performed by one or more other components of device 200.

Figure 3:
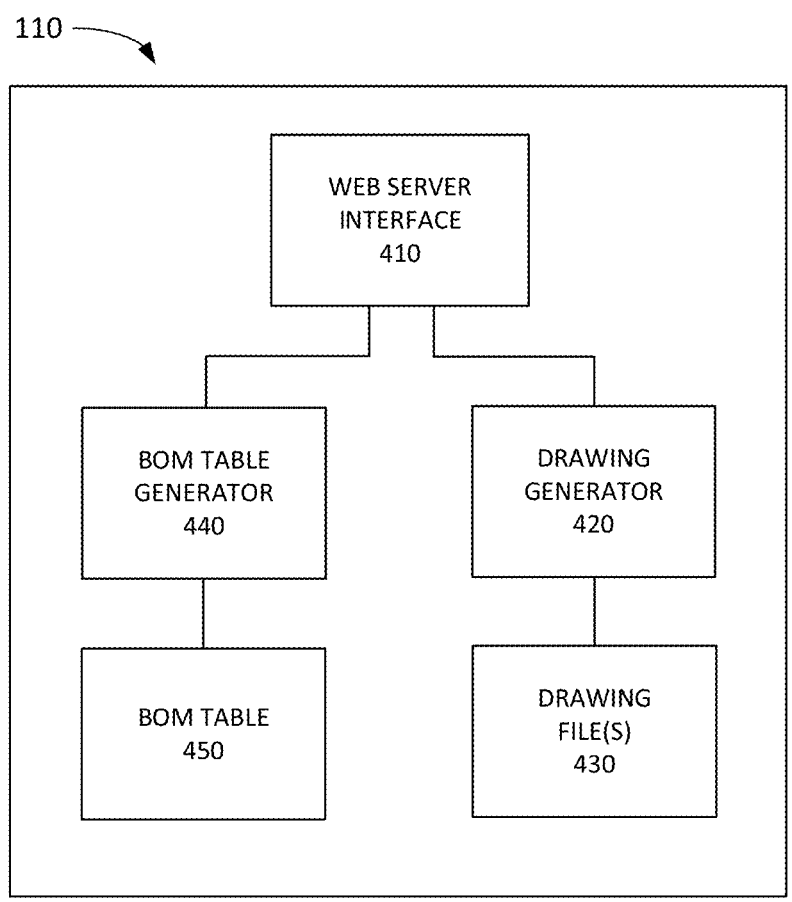
FIG. 3 illustrates exemplary functional components of the web client device of FIG. 1 according to an implementation described herein.

FIG. 3 illustrates exemplary functional components of the web client device 110. The functional components of web client device 110 may be implemented, for example, via processor 220 executing instructions from memory 230. For example, the functional components of web client device 110 may be implemented in client-side code (e.g., JavaScript code) obtained from catalog system 130 when web client device 110 accesses a Uniform Resource Identifier (URI) associated with a product page for a particular device or another kind of item. As shown in FIG. 3, web client device 110 may include a web server interface 410, a drawing generator 420, drawing file(s) 430, a BOM table generator 440, and a BOM table 450.

Web server interface 410 may be configured to communicate with a web server in catalog system 130. Drawing generator 420 may generate a drawing based on drawing file(s) 430. Drawing file(s) 430 may include SVG files, and/or other types of graphics files, for a device. Drawing file(s) may include a set of components for the device and each component may be associated with a label. The label may include, for example, text that identifies a part number for the component.

BOM table generator 440 may use web server interface 410 to request a real-time BOM for a device associated with drawing file(s) 430. For example, BOM table generator 440 may send an HTTP GET request to catalog system 130. The HTTP GET request may include an identifier for the device corresponding to drawing files(s) 430, which may be retrieved from drawing file(s) 430 by BOM table generator 440. Additionally, BOM table generator 440 may include authentication credentials for the user in the request.

BOM table generator 440 may receive, in response to the request, a real-time BOM from catalog system 130 via web server interface 410. The real-time BOM may be received, for example, as a JavaScript Object Notation (JSON) file and BOM table generator 440 may generate BOM table 450 based on the received JSON file. Exemplary information that may be included in BOM table 450 is described below with reference to FIG. 4.

BOM table generator 440 may process each entry in BOM table 450 by selecting an entry and matching the entry with a label in drawing file(s) 430 and/or in the displayed drawing. For example, BOM table generator 440 may match a part number in each entry in BOM table 450 with a part number included in a label of a component in the displayed drawing. If a match is found, BOM table generator 440 may add an event listener to the entry. The event listener may activate in response to a hover, mouse-over event over the entry, or a mouse click, and may highlight the entry as well as the matching label and/or the component in the drawing associated with the matching label. If no match is found, the entry may be altered to indicate no match, such as by graying out the entry, tinting the entry-off color, changing the font of the entry to a strikethrough font, blurring the text, and/or providing text indicating that no match has been found.

Although FIG. 3 shows exemplary components of web client device 110, in other implementations, web client device 110 may include fewer components, different components, additional components, or differently arranged components than depicted in FIG. 3. Additionally, or alternatively, one or more components of web client device 110 may perform one or more tasks described as being performed by one or more other components of web client device 110.

FIG. 4 illustrates exemplary components of BOM table 450. As shown in FIG. 4, BOM table 450 may include a set of BOM entries 400. Each BOM entry 400 may store information relating to a component of the device associated with BOM table 450. BOM entry 400 may include a part number field 410, a description field 420, a quantity field 430, an availability field 440, a lead time field 450, a matching label field 460, and an event listener field 470.

Part number field 410 may store a part number associated with the component. Description field 420 may store a description of the component. Quantity field 430 may store information identifying the current available quantity of the component. Availability field 440 may store information identifying whether the component is available at a supplier/manufacturer. Additionally, availability field 440 may include current price information. Lead time field 450 may store information identifying a lead time for when the component will be available, if the component is currently unavailable.

Matching label field 460 may store information identifying a matching label in the drawing if a match was identified for BOM entry 400 in a drawing that includes the component. If no matching label was identified, matching label field 460 may indicate that BOM entry 400 should be highlighted to indicate no match, such as by graying out, tinting off-color, with strikethrough, etc. Additionally, matching label field 460 may indicate whether the component corresponds to a subassembly. If the component corresponds to a subassembly associated with another drawing, matching label field 460 may include a link, such as a URI associated with the other drawing. Furthermore, for subassemblies, BOM entry 400 identify whether a subassembly is available for purchase as a parts kit (e.g., as a combination of components). Event listener 470 may identify an event listener associated with BOM entry 400.

Although FIG. 4 shows exemplary components of BOM table 450, in other implementations, BOM table 450 may include fewer components, different components, additional components, or differently arranged components than depicted in FIG. 4.

Figure 5:
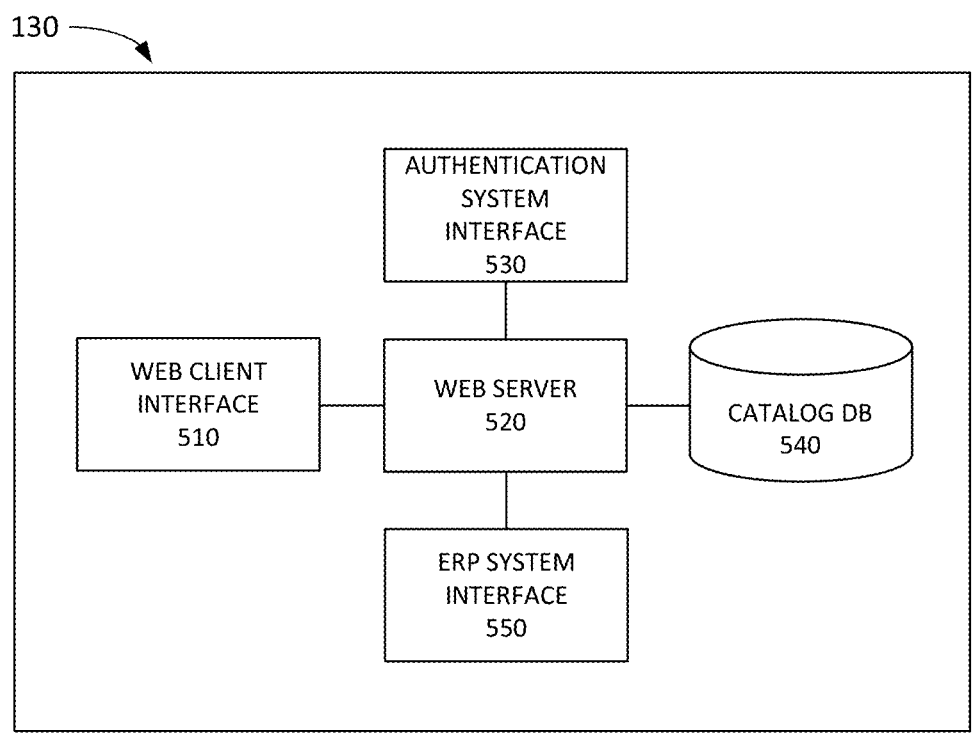
FIG. 5 illustrates exemplary functional components of the catalog system of FIG. 1 according to an implementation described herein.

FIG. 5 illustrates exemplary functional components of catalog system 130. The functional components of catalog system 130 may be implemented, for example, via processor 220 executing instructions from memory 230. As shown in FIG. 5, catalog system 130 may include a web client interface 510, a web server 520, an authentication system interface 530, a catalog DB 540, and an ERP system interface 550.

Web client interface 510 may be configured to communicate with web client device 110. Web server 520 may host a server that provides content to web client device 110 via web client interface 510. For example, web server 520 may respond to requests for content associated with a URI from web client device 110. Authentication system interface 530 may be configured to communicate with authentication system 140. For example, authentication system interface 530 may send a request to authentication system 140 to authenticate a user associated with web client device 110 before providing a requested real-time BOM to web client device 110.

Catalog DB 540 may store the content for an online content catalog. For example, content catalog DB 540 may store files for web pages associated with products. Each web page may include drawing files for a device or another type of product and code for obtaining a real-time BOM for the device or another type of product. ERP system interface 550 may be configured to communicate with ERP system 150. For example, ERP system interface 550 may obtain a real-time BOM from ERP system 150.

Although FIG. 5 shows exemplary components of catalog system 130, in other implementations, catalog system 130 may include fewer components, different components, additional components, or differently arranged components than depicted in FIG. 5.

Figure 6:
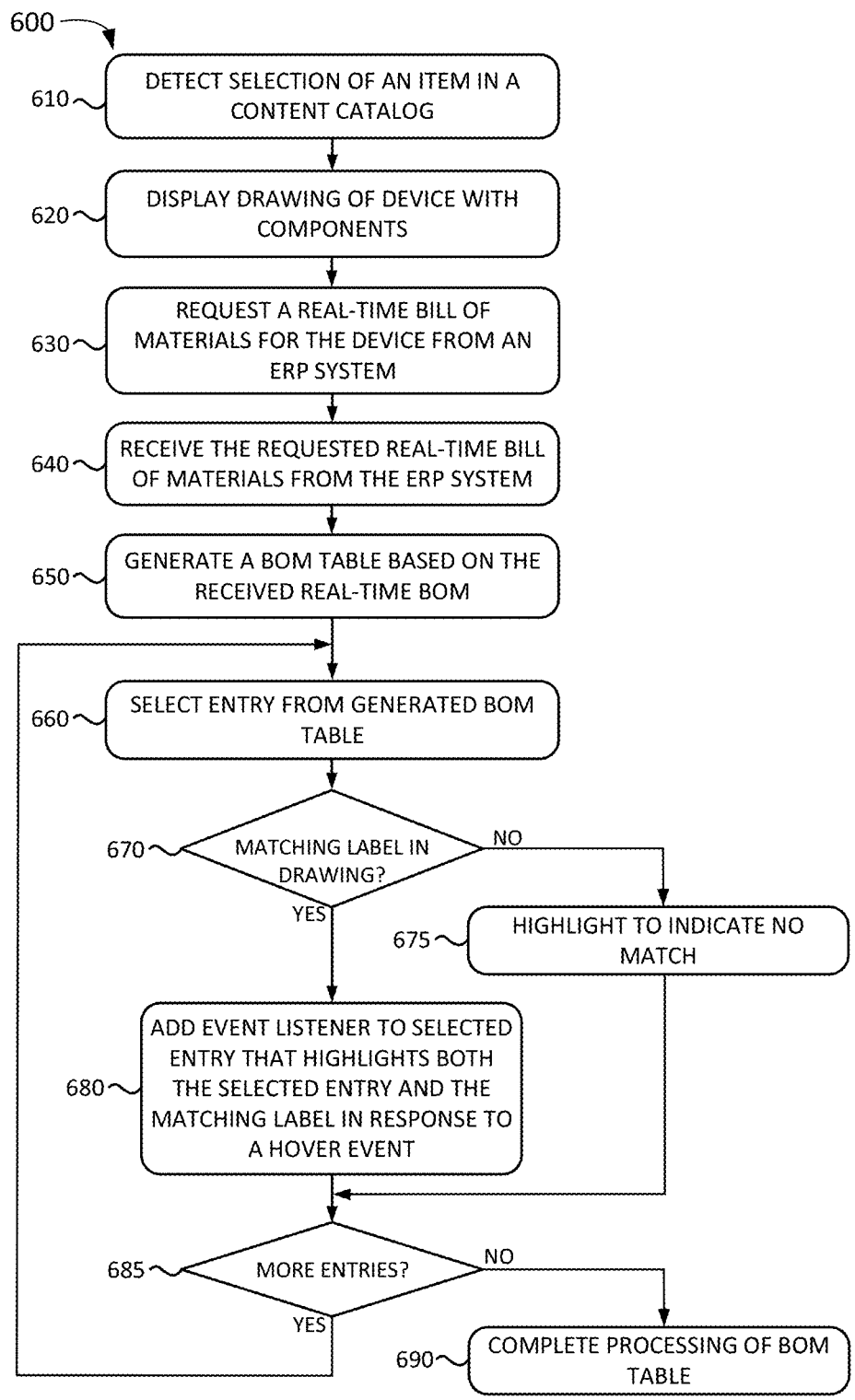
FIG. 6 is a flowchart of a process for generating a BOM table according to an implementation described herein.

FIG. 6 is a flowchart of a process 600 for generating a BOM table according to an implementation described herein. In some implementations, the process of FIG. 6 may be performed by web client device 110. In other implementations, some or all of the process of FIG. 6 may be performed by another device or a group of devices separate from web client device 110.

As shown in FIG. 6, process 600 may include detecting selection of an item in a content catalog (block 610). For example, web client device 110 may access a URI associated with an item in content catalog. The item may correspond to a device with components and the URI may include a web page that includes one or more SVG files for generating a drawing of the device and its components. Furthermore, the web page may include client-side JavaScript for requesting a real-time BOM associated with the device.

Process 600 may further include displaying a drawing of a device with components (block 620) and requesting a real-time BOM for the device from an ERP system (block 630). For example, web client device 110 may generate a drawing from the received SVG file(s) and execute the client-side JavaScript to generate an HTTP GET request to request a real-time BOM associated with device displayed in the drawing. The HTTP GET request may include an identifier associated with the device, such as, for example, a part number. Furthermore, the HTTP GET request may include authentication credentials associated with a user of web client device 110, such as, for example, login credentials for accessing the content catalog. The HTTP GET request may be sent to catalog system 130.

Process 600 may further include receiving the requested real-time BOM from the ERP system (block 640) and generating a BOM table based on the received real-time BOM (block 650). For example, web client device 110 may receive a JSON file from catalog system 130 that catalog system 130 obtained from ERP system 150. Web client device 110 may generate and display a BOM table based on the received JSON file.

An entry from the generated BOM table may be selected (block 660) and a determination made as to whether there is a matching label in the drawing (block 670). For example, web client device 110 may select an entry from BOM table 450, access an identifier for a component in the entry, such as a part number associated with a component, and determine whether a label in the displayed drawing, and/or a label in the SVG file used to generate the drawing, includes a matching identifier.

If there is no matching label (block 670—NO), the selected entry may be highlighted to indicate no match (block 675). For example, the selected entry may be tinted off-color, grayed out, changed to a strikethrough font, blurred, or otherwise highlighted to indicate no match in the drawing and/or unavailability of the entry in matching to a component in the drawing.

If there a matching label (block 670—YES), an event listener may be added to the selected entry that highlights both the selected entry and the matching label in response to a hover event (block 680). For example, web client device 110 may generate an event listener function for the selected entry. The event listener function may listen for a hover or mouse-over event over the area on the displayed screen associated with the selected entry. If the user's cursor hovers over the area associated with the selected entry, the selected entry and the matching label may be highlighted. For example, the background of the selected entry and the matching label may be changed to a color that is different from the background color, the font for the text may be changed to a larger text, bolder text, and/or text of a different color, a border may be added around the selected entry and the matching label, and/or a different form of highlighting may be used.

Furthermore, in some implementations, the component associated with label may also be highlighted. For example, the component in the drawing may be changed to a different color or a border may be added around the component to highlight the component. Moreover, in some implementations, an event listener may also be added to the label and/or component. Thus, when the user's cursor hovers over the matching label or the component in the drawing corresponding to the matching label, the label and/or the component may be highlighted and the matching entry in the BOM table may be highlighted as well.

A determination may be made as to whether there are more entries in the table to process (bloc 685). If there are more entries (block 685—YES), processing may return to block 660 to select another entry to process. If there are no more entries (block 685—NO), processing of the BOM table may be completed (block 690).

Figure 7:
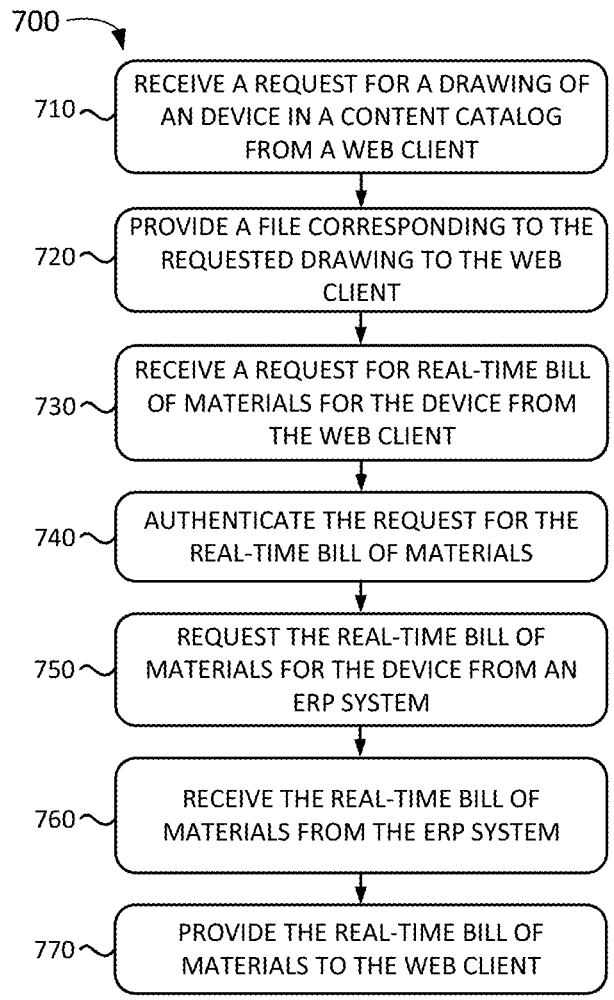
FIG. 7 is a flowchart of a process for providing a BOM table to a web client according to an implementation described herein.

FIG. 7 is a flowchart of a process 700 for providing a BOM table to a web client according to an implementation described herein. In some implementations, the process of FIG. 7 may be performed by catalog system 130. In other implementations, some or all of the process of FIG. 7 may be performed by another device or a group of devices separate from catalog system 130.

As shown in FIG. 7, process 700 may include receiving a request for a drawing of a device in a content catalog from a web client (block 710) and a file corresponding to the requested drawing may be provided to the web client (block 720). For example, a HTTP GET request may be received from web client device 110 for a URI that includes file(s) for displaying a drawing of the device in the content catalog and the file(s) may be provided to web client device 110.

Process 700 may further include receiving a request for a real-time BOM for the device from the web client (block 730) and the request may be authenticated (block 740). For example, an HTTP GET request may be received from web client device 110 for a real-time BOM from ERP system 150. The HTTP GET request may include an identifier associated with the device (e.g., a part number, etc.) and authentication credentials associated with the user of web client device 110. Catalog system 130 may authenticate the user with authentication system 140.

Process 700 my further include requesting the real-time BOM for the device from an ERP system (block 750), receiving the real-time BOM from the ERP system (block 760), and providing the real-time BOM to the web client device (block 770). For example, catalog system 130 may send a request to ERP system 150 for the real-time BOM using the part number or another type of identifier, may receive the real-time BOM from ERP system 150 as a JSON file, or another type of file, and may provide the received JSON file to web client device 110.

Figure 8:
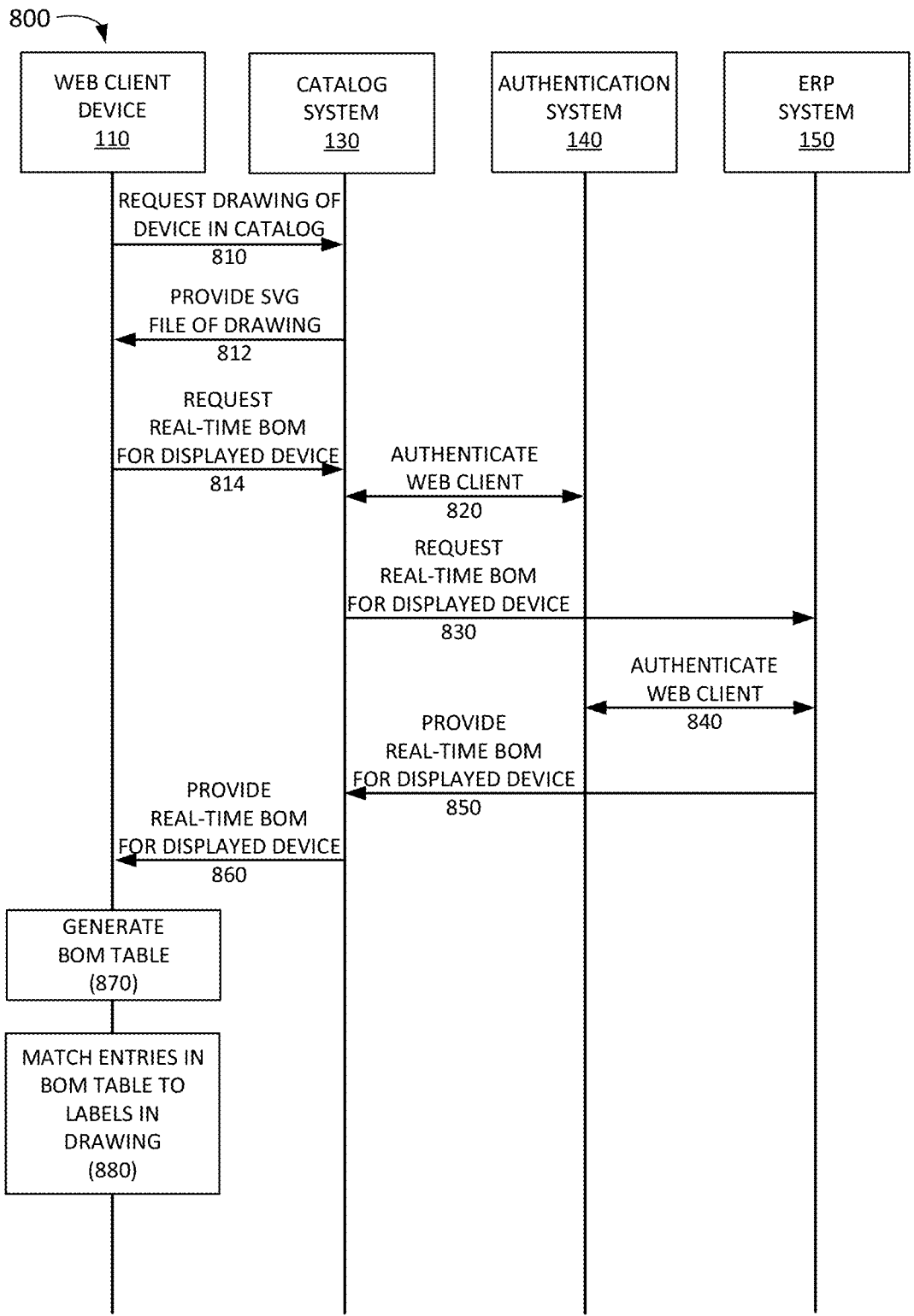
FIG. 8 is diagram of an exemplary signal flow according to an implementation described herein.

FIG. 8 is diagram of an exemplary signal flow 800 according to an implementation described herein. As shown in FIG. 8, signal flow 800 may include web client device 110 requesting a drawing of a device in a catalog (signal 810) and catalog system 130 providing an SVG file to web client device 110 (signal 812). For example, a customer may use web client device 110 to access a web site hosting an online catalog and select a web page for a device. The web page code may include instructions to obtain an SVG file for a drawing of the device and to generate a drawing based on the svg file.

Additionally, the web page code may include instructions to obtain a real-time BOM for the device. In response, the web browser or another type of application displaying the drawing may send a request, such as an HTTP GET request, to catalog system 130 to obtain the real-time BOM for the device (signal 814). The request may include an authentication token associated with the customer (e.g., a token based on the login credentials for the customer). Catalog system 130 may receive the request and may authenticate the request with authentication system 140 (signal 820). If web client device 110 is authenticated, catalog system 130 may request the real-time BOM for the displayed device from ERP system 150 (signal 830). ERP system 150 may authenticate web server 520 of catalog system 130 with authentication system 140 (signal 840). For example, the request to ERP system 150 may include authentication credentials associated with web server 520.

If web server 520 is authenticated, ERP system 150 may provide the requested BOM to web server 520 of catalog system 130 (signal 850) and catalog system 130 may respond to the HTTP GET request by forwarding the received BOM to web client device 110 (signal 860). The web browser application running on web client device 110 may receive the BOM and generate a BOM table based on the received BOM (block 870) and match entries in the generated BOM table to labels in the drawing (block 880). If an entry cannot be matched, the entry may be grayed out, tinted off-color, altered with strikethrough, or otherwise altered to indicate unavailability. An event listener may be added to each matched entry with a function to highlight the entry as well as the matching label when a hover event is detected.

Figure 9:
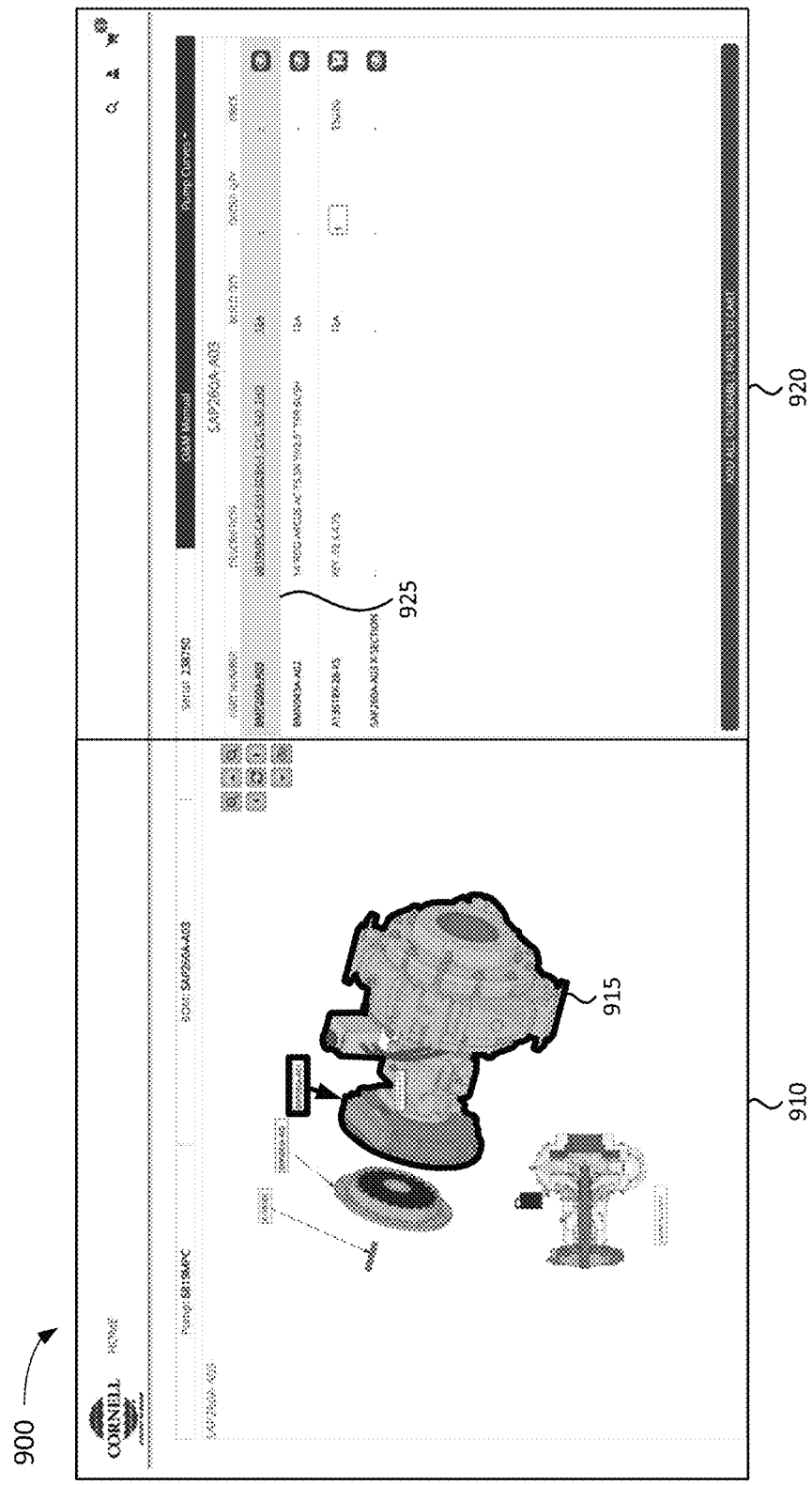
FIG. 9 is a diagram of a first exemplary user interface according to an implementation described herein.

FIG. 9 is a diagram of a first exemplary user interface 900 according to an implementation described herein. As shown in FIG. 9, user interface 900 includes a web page of a pump device that includes a drawing 910 and a BOM 920. BOM 920 may be obtained in real-time from ERP system 150 when drawing 910 is accessed and each entry in BOM 920 may be matched to a label and corresponding part/component in drawing 910 and an event listener may be added to each entry to detect hover events. As shown in FIG. 9, when the user hovers the cursor over entry 925 in BOM 920 or clicks on entry 925, entry 925 may be highlighted (e.g., the background changed to a different color, the text bolded or made larger, a border added around the area, etc.) and the corresponding component 915 in drawing 910 may also be highlighted. In some implementations, the label of the component may be highlighted. In other implementations, the label and the component itself may both be highlighted. In some implementations, an event listener may also be added to each label in the drawing and when the user hovers over the label, the label and the entry in the BOM may be highlighted. For example, if the user hovers over the label of component 915, the label and the drawing of component 915 may be highlighted and the matched entry 925 may be highlighted at the same time.

Figure 10:
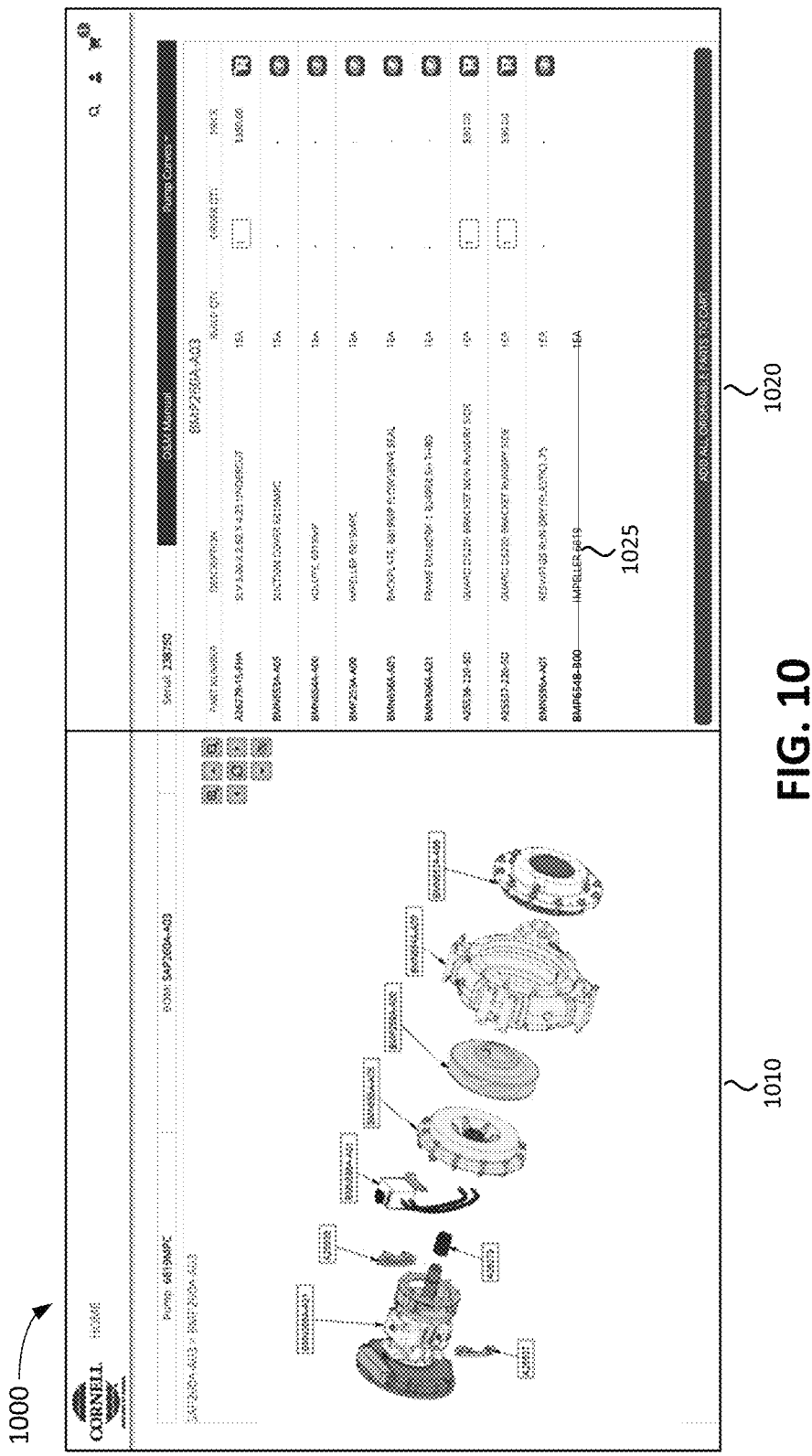
FIG. 10 is a diagram of a second exemplary user interface according to an implementation described herein.

FIG. 10 is a diagram of a second exemplary user interface 1000 according to an implementation described herein. As shown in FIG. 10, user interface 1000 includes a web page of a pump subassembly that includes a drawing 1010 and a BOM 1020. Drawing 1010 may include a subassembly that corresponds to component 915 shown in FIG. 9. The drawings of devices may be hierarchically structured and a component of a device included in a drawing may correspond to a subassembly with its own set of components. When a subassembly component is selected, the browser application may request the drawing corresponding to selected subassembly and may further request a corresponding BOM from ERP system 150 via catalog system 130. Thus, when a user selects component 915, or entry 925, the browser application may request a web page that includes SGV files to generate drawing 1010 and may further request a real-time BOM used to generate BOM 1020. BOM 1020 may include an entry 1025 for which a match in the labels of drawing 1010 was not identified. Therefore, entry 1025 may be highlighted in a manner to indicate that entry 1025 is not in drawing 1010, such as by changing the font of entry 1025 to a strikethrough font.

Figure 11:
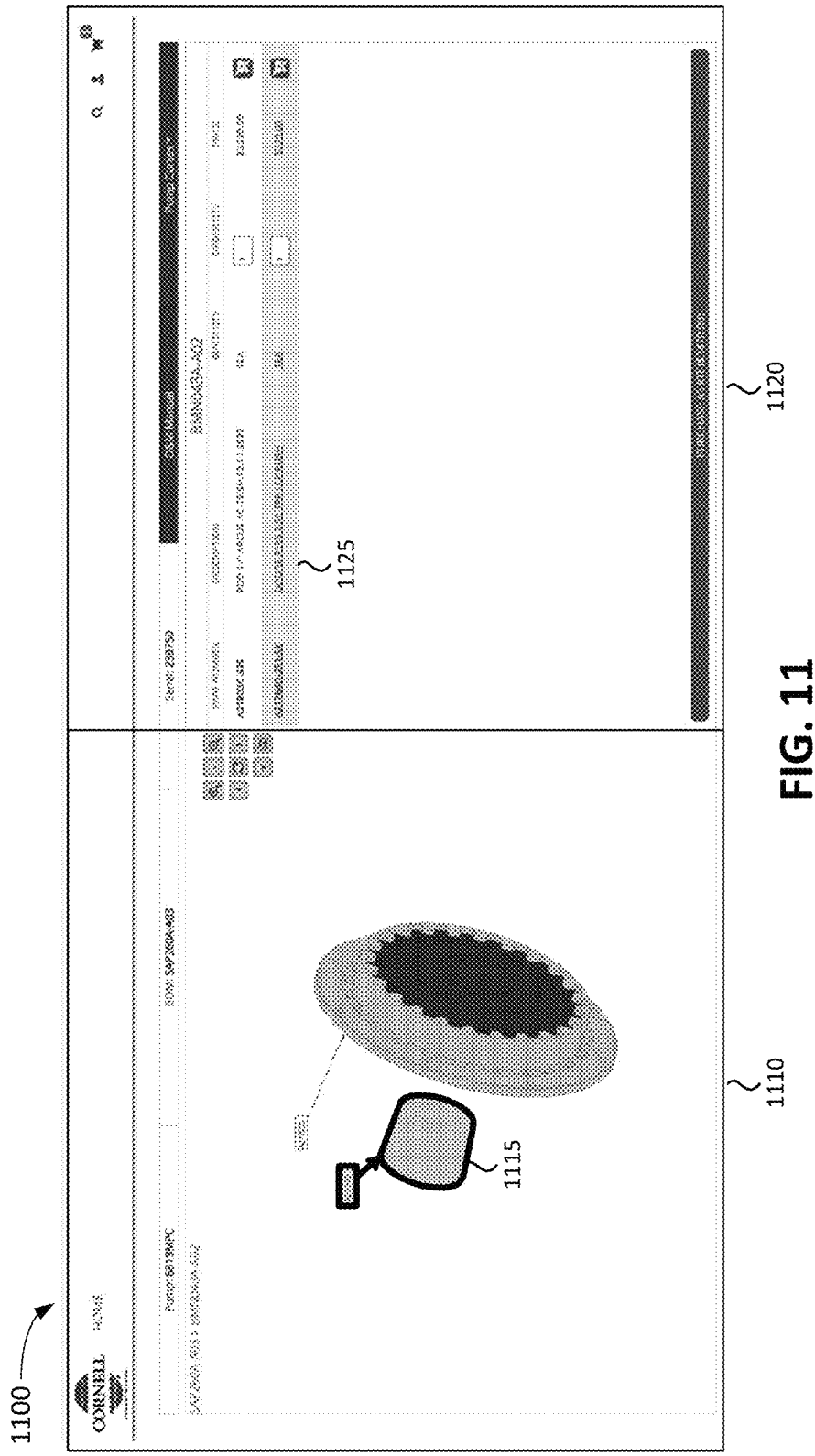
FIG. 11 is a diagram of a third exemplary user interface according to an implementation described herein.

FIG. 11 is a diagram of a third exemplary user interface 1100 according to an implementation described herein. As shown in FIG. 11, user interface 1100 includes a web page of a pump subassembly that includes a drawing 1110 and a BOM 1120. Drawing 1110 may include a subassembly that corresponds to another component of the pump shown in drawing 910. Thus, when a user selects the component, the browser application may request a web page that includes SGV files to generate drawing 1110 and may further request a real-time BOM used to generate BOM 1120. When the user hovers the cursor over entry 1125 in BOM 1120, entry 1125 may be highlighted and the corresponding component 1115 in drawing 1110 may also be highlighted (e.g., the background changed to a different color, the text bolded or made larger, a border added around the area, etc.).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 6 and 7, and a series of signals have been described with respect to FIG. 8, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code——it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method performed by a computer device, the method comprising:
   accessing, by a computer device, a web page associated with an item in a content catalog;
   displaying, by the computer device and on a display device, a drawing of a device corresponding to the selected item, wherein the device includes a plurality of components, and wherein the plurality of components is associated with a plurality of labels;
   executing, by the computer device, code included in the web page, wherein the code sends a Hypertext Transfer Protocol (HTTP) request for a real-time bill of materials (BOM) corresponding to the device from a web server associated with an enterprise resource planning (ERP) system, in response to accessing the web page;
   receiving, by the computer device, the requested real-time BOM from the ERP system;
   generating, by the computer device, a BOM table based on the received real-time BOM;
   matching, by the computer device, particular entries in the generated BOM table with particular ones of the plurality of components, wherein the matching includes:
      selecting an entry in the generated BOM table;
      identifying a label, from the plurality of labels, that matches the selected entry;
      associating the selected entry with the identified label;
      adding an event listener to the selected entry; and
      configuring the event listener to highlight the selected entry and the identified label in response to a hover or mouse-over event for the selected entry;
   displaying, by the computer device and on the display device, the generated BOM table in association with the displayed drawing of the device;
   detecting, by the computer device and using the event listener, the hover or mouse-over event for the selected entry in the displayed BOM table;
   highlighting, by the computer device and on the display device, the selected entry, in response to detecting the hover or mouse-over event, wherein highlighting the selected entry changes a displayed appearance of the selected entry; and highlighting, by the computer device and on the display device, a component, of the plurality of components, that matches the selected entry, in response to detecting the hover or mouse-over event, wherein highlighting the component changes a displayed appearance of the component.

2. The method of claim 1, wherein displaying the drawing of the device corresponding to the selected item includes:
generating the drawing based on a scalable vector graphic file of the device.

3. The method of claim 1, wherein the HTTP request includes an authentication token associated with a user of the content catalog.

4. The method of claim 1, wherein the received real-time BOM includes a plurality of entries, wherein a particular one of the plurality of entries includes:
a part number,
a part description for the part number,
an available quantity for the part number,
a stock availability for the part number, or
a lead time for the part number.

5. The method of claim 1, further comprising:
selecting another entry in the generated BOM table;
determining that no match exists for the selected other entry in the plurality of components; and
displaying the selected other entry in a different color than other entries, in response to determining that no match exists for the selected other entry in the plurality of components.

6. The method of claim 1, further comprising:
detecting selection of a component, of the plurality of components;
determining that the selected component corresponds to another device that includes another plurality of components;
displaying another drawing of the other device, in response to determining that the selected component corresponds to the other device;
requesting another real-time BOM corresponding to the other device from the ERP system, in response to displaying the other drawing;
receiving the requested other real-time BOM from the ERP system;
generating another BOM table based on the received other real-time BOM; and
matching particular entries in the generated other BOM table with particular ones of the other plurality of components.

7. The method of claim 1, wherein executing the code included in the web page includes:
retrieving an identifier for the device corresponding to the selected item from a drawing file associated with the device; and
sending an HTTP GET request to the web server associated with the ERP system, wherein the HTTP GET request includes the retrieved identifier for the device.

8. A computer device comprising:
a memory storing instructions; and
a processor configured to execute the instructions to:
access a web page associated with an item in a content catalog;
display, on a display device, a drawing of a device corresponding to the selected item, wherein the device includes a plurality of components, and wherein the plurality of components is associated with a plurality of labels;
execute code included in the web page, wherein the code sends a Hypertext Transfer Protocol (HTTP) request for a real-time bill of materials (BOM) corresponding to the device from a web server associated with an enterprise resource planning (ERP) system, in response to accessing the web page;
receive the requested real-time BOM from the ERP system;
generate a BOM table based on the received real-time BOM;
match particular entries in the generated BOM table with particular ones of the plurality of components, wherein, when matching the particular entries in the generated BOM table with the particular ones of the plurality of components, the processor is further configured to:
select an entry in the generated BOM table;
identify a label, from the plurality of labels, that matches the selected entry;
associate the selected entry with the identified label;
add an event listener to the selected entry; and
configure the event listener to highlight the selected entry and the identified label in response to a hover or mouse-over event for the selected entry;
display, on the display device, the generated BOM table in association with the displayed drawing of the device;
detect, using the event listener, the hover or mouse-over event for the selected entry in the displayed BOM table;
highlight, on the display device, the selected entry, in response to detecting the hover or mouse-over event, wherein highlighting the selected entry changes a displayed appearance of the selected entry; and
highlight, on the display device, a component, of the plurality of components, that matches the selected entry, in response to detecting the hover or mouse-over event, wherein highlighting the component changes a displayed appearance of the component.

9. The computer device of claim 8, wherein, when displaying the drawing of the device corresponding to the selected item, the processor is further configured to:
generate the drawing based on a scalable vector graphic file of the device.

10. The computer device of claim 8, wherein the received real-time BOM includes a plurality of entries, wherein a particular one of the plurality of entries includes:
a part number,
a part description for the part number,
an available quantity for the part number,
a stock availability for the part number, or
a lead time for the part number.

11. The computer device of claim 8, wherein the processor is further configured to:
select another entry in the generated BOM table;
determine that no match exists for the selected other entry in the plurality of components; and
tint the selected other entry off color, in response to determining that no match exists for the selected other entry in the plurality of components.

12. The computer device of claim 8, wherein the processor is further configured to:

detect selection of a component, of the plurality of components;
determine that the selected component corresponds to another device that includes another plurality of components;
display another drawing of the other device, in response to determining that the selected component corresponds to the other device;
request another real-time BOM corresponding to the other device from the ERP system, in response to displaying the other drawing;
receive the requested other real-time BOM from the ERP system;
generate another BOM table based on the received other real-time BOM; and
match particular entries in the generated other BOM table with particular ones of the other plurality of components.

13. The computer device of claim 8, wherein, when executing the code included in the web page, the processor is further configured to:
retrieve an identifier for the device corresponding to the selected item from a drawing file associated with the device; and
send an HTTP GET request to the web server associated with the ERP system, wherein the HTTP GET request includes the retrieved identifier for the device.

14. A non-transitory computer-readable memory device storing instructions executable by a processor, the non-transitory computer-readable memory device comprising:
one or more instructions to access a web page associated with an item in a content catalog;
one or more instructions to display, on a display device, a drawing of a device corresponding to the selected item, wherein the device includes a plurality of components, and wherein the plurality of components is associated with a plurality of labels;
one or more instructions to execute code included in the web page, wherein the code sends a Hypertext Transfer Protocol (HTTP) request for a real-time bill of materials (BOM) corresponding to the device from a web server associated with an enterprise resource planning (ERP) system, in response to accessing the web page;
one or more instructions to receive the requested real-time BOM from the ERP system;
one or more instructions to generate a BOM table based on the received real-time BOM;
one or more instructions to match particular entries in the generated BOM table with particular ones of the plurality of components, wherein the one or more instructions to match the particular entries in the generated BOM table with the particular ones of the plurality of components further include:
one or more instructions to select an entry in the generated BOM table;
one or more instructions to identify a label, from the plurality of labels, that matches the selected entry;
one or more instructions to associate the selected entry with the identified label;
one or more instructions to add an event listener to the selected entry; and
one or more instructions to configure the event listener to highlight the selected entry and the identified label in response to a hover or mouse-over event for the selected entry;
one or more instructions to display, on the display device, the generated BOM table in association with the displayed drawing of the device;
one or more instructions to detect, using the event listener, the hover or mouse-over event for the selected entry in the displayed BOM table;
one or more instructions to highlight, on the display device, the selected entry, in response to detecting the hover or mouse-over event, wherein highlighting the selected entry changes a displayed appearance of the selected entry; and
one or more instructions to highlight, on the display device, a component, of the plurality of components, that matches the selected entry, in response to detecting the hover or mouse-over event, wherein highlighting the component changes a displayed appearance of the component.

15. The non-transitory computer-readable memory device of claim 14, wherein the one or more instructions to execute the code included in the web page further include:
one or more instructions to retrieve an identifier for the device corresponding to the selected item from a drawing file associated with the device; and
one or more instructions to send an HTTP GET request to the web server associated with the ERP system, wherein the HTTP GET request includes the retrieved identifier for the device.

16. The non-transitory computer-readable memory device of claim 14, wherein the one or more instructions to display the drawing of the device corresponding to the selected item further include:
one or more instructions to generate the drawing based on a scalable vector graphic file of the device.

17. The non-transitory computer-readable memory device of claim 14, wherein the received real-time BOM includes a plurality of entries, wherein a particular one of the plurality of entries includes:
a part number,
a part description for the part number,
an available quantity for the part number,
a stock availability for the part number, or
a lead time for the part number.

18. The non-transitory computer-readable memory device of claim 14, further comprising:
one or more instructions to select another entry in the generated BOM table;
one or more instructions to determine that no match exists for the selected other entry in the plurality of components; and
one or more instructions to display the selected other entry in a different color than other entries, in response to determining that no match exists for the selected other entry in the plurality of components.

19. The non-transitory computer-readable memory device of claim 14, further comprising:
one or more instructions to detect selection of a component, of the plurality of components;
one or more instructions to determine that the selected component corresponds to another device that includes another plurality of components;
one or more instructions to display another drawing of the other device, in response to determining that the selected component corresponds to the other device;
one or more instructions to request another real-time BOM corresponding to the other device from the ERP system, in response to displaying the other drawing;

one or more instructions to receive the requested other real-time BOM from the ERP system;
one or more instructions to generate another BOM table based on the received other real-time BOM; and
one or more instructions to match particular entries in the generated other BOM table with particular ones of the other plurality of components.

\* \* \* \* \*